(12) United States Patent
Luscombe et al.

(10) Patent No.: US 6,307,809 B1
(45) Date of Patent: Oct. 23, 2001

(54) GEOPHONE WITH OPTICAL FIBER PRESSURE SENSOR

(75) Inventors: John Luscombe, Sugarland, TX (US); Malcolm Paul Varnham; Erhard Lothar Edgar Kluth, both of Alresford (GB)

(73) Assignee: GeoSensor Corporation, Houston, TX (US)

( * ) Notice: Subject to any disclaimer, the term of this patent is extended or adjusted under 35 U.S.C. 154(b) by 0 days.

(21) Appl. No.: 09/330,587

(22) Filed: Jun. 11, 1999

(51) Int. Cl.[7] .................................................. H04R 17/00
(52) U.S. Cl. .............................................. 367/17; 367/149
(58) Field of Search ............................. 367/17, 149, 20, 367/151

(56) References Cited

U.S. PATENT DOCUMENTS

| | | | |
|---|---|---|---|
| 4,293,188 | * 10/1981 | McMahon | 367/149 |
| 4,530,078 | * 7/1985 | Lagakos et al. | 367/149 |
| 6,160,762 | * 12/2000 | Luscombe et al. | 367/149 |

* cited by examiner

*Primary Examiner*—Jay Patidar
*Assistant Examiner*—Victor J. Taylor
(74) *Attorney, Agent, or Firm*—Bracewell & Patterson, L.L.P.

(57) ABSTRACT

A pressure sensitive optical fiber is enclosed within a pressure chamber. A mass is positioned so as to vary the pressure in the pressure chamber in response to a seismic signal. Variations in the chamber pressure are directly detected by the pressure sensitive fiber.

10 Claims, 1 Drawing Sheet

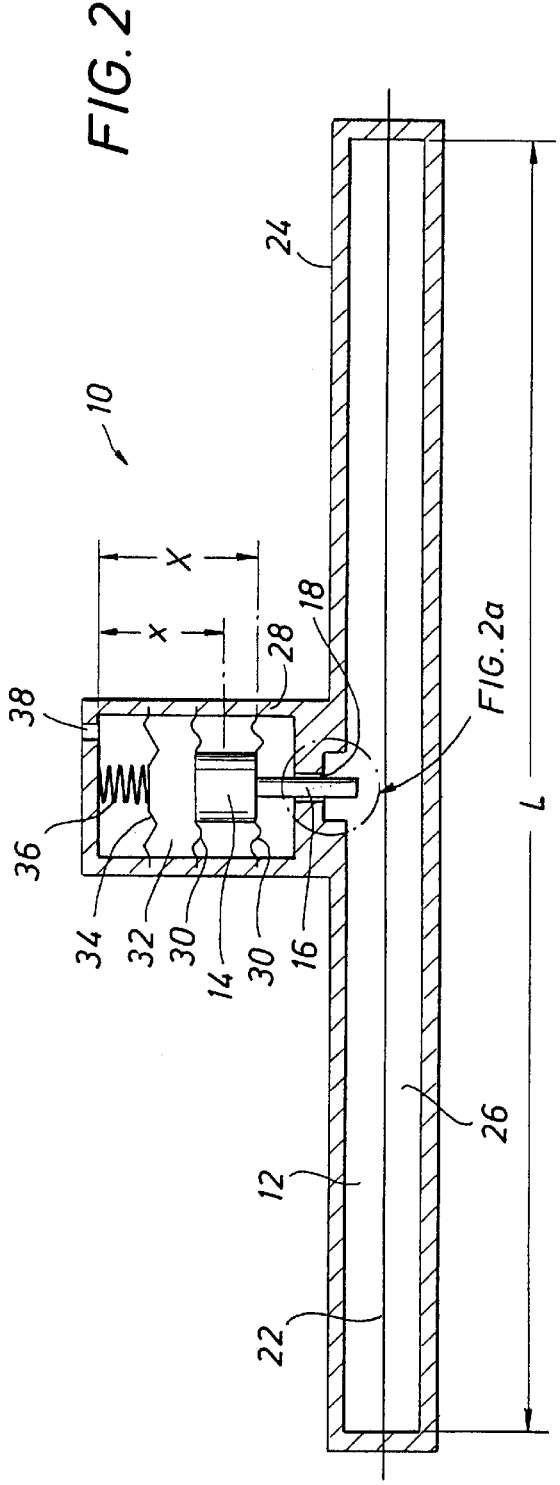
FIG. 2
FIG. 2a
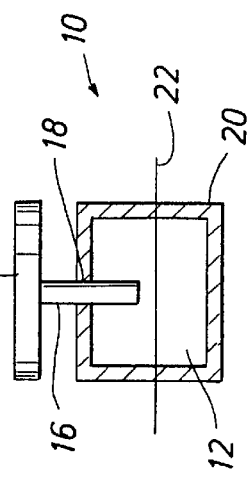
FIG. 1

GEOPHONE WITH OPTICAL FIBER PRESSURE SENSOR

FIELD OF THE INVENTION

The present invention relates generally to the field of seismic sensors and, more particularly, to a geophone with a pressure sensor including an optical fiber.

BACKGROUND OF THE INVENTION

A conventional geophone uses a permanent magnet and electric coils suspended by springs or other means such as air, oil, and the like to dampen oscillations of a mass within the geophone. A number of geophones are connected to a seismic cable, which ultimately is connected to a recording vehicle, such as a truck. A seismic signal is generated by way of an explosion or other vibration source. The vibrations create motion of the geophone which in turn causes the coil to move. The movement of the coil in the magnetic field induces a flow of electric current which is detected and recorded at the seismic truck.

A velocity geophone commonly in use today measures the velocity of the sensor casing along its sensitive axis. Typically, the measurement frequency band of such a geophone is 10–500 Hz and the amplitude range is 0.25 $\mu$m/sec. to 25 mm/sec (100 dB dynamic range). Such a device uses a proof mass and spring structure to detect the motion of the sensor. The spring constant and mass are selected so that the resonant frequency is typically below 10 Hz. Below resonance, the displacement of the proof mass, relative to the sensor casing, is proportional to the acceleration of the casing. Above resonance, displacement of the proof mass is equal to the displacement of the casing.

When the frequency of the driving motion from the seismic signal is above the resonance of the device, the proof mass is effectively stationary in inertial space, while the casing moves with the driving motion. Consequently, the displacement of the case, relative to the mass, is a direct measure of the driving motion (i.e., the seismic signal).

The displacement is measured electrically by the sensing coil, which acts as the proof mass and is suspended by the spring. A magnetic circuit is provided in the casing and as the coil moves in the magnetic field, an electric current is generated that is proportional to the rate of change of flux through the coil. The rate of change of flux is directly proportional to the velocity of the coil relative to the casing. One may then derive displacement by integration of the velocity signal.

The dynamic quantity measured by a geophone depends on the method for detecting the position of the mass, relative to the casing. Using electromagnetic induction in a pick-up coil gives a velocity output. A displacement geophone uses a detection method that measures the position of the mass directly and therefore gives an output that is proportional to casing displacement.

In some circumstances, this direct measurement of displacement is desirable. If the geophysical quantity of interest is the displacement, then there are definite advantages in measuring the displacement directly, rather than deriving it by integration of the velocity.

Recent developments of fiber optic technology have also shown the benefits of the application of this technology to seismic exploration in both geophones and hydrophones, in addition to the traditional role of data transmission in the system as a whole. However, there remains a need for a geophone that measures displacement directly, and in particular using an optical fiber in the sensing apparatus.

SUMMARY OF THE INVENTION

The present invention provides a method and structure to detect a seismic signal as a variation in pressure in an enclosed chamber which encloses a pressure sensitive sensor element such as a hydrophone or an optical fiber. The chamber is filled with a fluid which exhibits a spring constant. A mass is positioned above the enclosed chamber and a shaft extended from the bottom of the mass penetrates into the enclosed chamber. A soft spring in abutting contact with a fluid reservoir above the mass maintains a bias force on the mass.

An acoustic signal above the resonant frequency of the geophone causes the mass to remain stationary in inertial space as the enclosure moves in response to the acoustic signal. This creates a time varying pressure in the pressure chamber, and this pressure signal is impressed on the optical fiber. This alters the optical path length of the fiber as a function of the acoustic signal, and is thus detected.

These and other features of the present invention will be apparent to those skilled in the art from a review of the following detailed description.

BRIEF DESCRIPTION OF THE DRAWINGS

FIG. 1 is a schematic view of the geophone to show the most basic components of invention.

FIG. 2 is a side sectional view of the geophone of this invention.

FIG. 2a is a side sectional view of a detail of the geophone.

DETAILED DESCRIPTION OF A PREFERRED EMBODIMENT

Background

FIG. 1 depicts a stylized schematic of the geophone 10 of this invention. In the broadest sense, the geophone comprises a liquid spring 12 and a proof mass 14, where the proof mass is a piston. A liquid has a bulk modulus of elasticity comparable with solids and is used in this structure as a spring.

The mass 14 is coupled to a shaft 16 which penetrates an opening 18 in a reservoir 20, which encloses the liquid spring 12. The liquid spring 12 within the reservoir exhibits a resonant frequency defined by $$f = \frac{1}{2\pi}\sqrt{\frac{A^2 K}{Vm}}$$

where m is the mass of the piston 14, d is the diameter of the shaft 16, V is the volume of the reservoir 20, A is the cross-sectional area of the shaft and K is the bulk modulus of the liquid. Substituting the following exemplary values for these variables:

d=5×10$^{-4}$ m

K=2.2×10$^9$ Pa

V=6×10$^{-6}$ m$^3$ m=10$^{-2}$ kg gives

A=1.963×10$^{-7}$ m$^2$ and the resonant frequency f=5.98 Hz.

If the geophone 10 is driven at a frequency by a seismic signal above the resonant frequency f, the piston remains fixed in inertial space and the reservoir moves relative to the piston shaft, causing compression of the liquid spring 12, and hence a rise in pressure in the reservoir. The pressure rise is proportional to the change in the length of shaft in the liquid reservoir. Consequently, the pressure is a direct measure of the displacement of the casing.

A number of structures can be used to measure the pressure in the reservoir 20. Such structures may include a piezoelectric bender element, a hydrophone, or other appropriate means for detecting reservoir pressure and variations in pressure. In the preferred embodiment, the structure includes a pressure sensitive optical fiber 22 whose optical path length is changed by an alteration of the pressure in the reservoir 20. The signal in the form of an alteration in the fiber's optical path length is detected with an interferometer.

Now that the basic structure of the invention has been described, the following describes some considerations in geophone performance, before the preferred structure is described in detail.

Geophone Performance and the Advantage of a Displacement Geophone

The purpose of a geophone is to measure the seismic wave field. The performance requirements for the sensor depend on the range of energies of the waves to be detected. Since the energy of a wave depends on the square of the displacement, the performance of the sensor should be specified in terms of upper and lower limits on the displacement signal levels.

The displacement x has a dynamic range given by $$S = 20 \log(x_{max}/x_{min})$$

where $x_{max}$ and $x_{min}$ are the maximum and minimum signal levels.

If a velocity sensor is used to measure displacement, then the signal dynamic range needed can be derived from the dynamic range for the displacement over a given frequency range.

For a sinusoid signal, $$x = |x|e^{j\omega t} \quad v = \frac{dx}{dt} j\omega |x| e^{j\omega t} \quad |v| = \omega |x|$$

Hence $$v_{max} = \omega_{max} x_{max} \quad v_{min} = \omega_{min} x_{min}$$

Then the dynamic range of the velocity signal is $$T = 20 \log\left(\frac{v_{max}}{v_{min}}\right) = S + R$$

where
R=20 log $$R = 20 \log\left(\frac{f_{max}}{f_{min}}\right) \quad \text{and} \quad f = \frac{\omega}{2\pi},$$

and $f_{max}$ and $f_{min}$ are the upper and lower limits of the frequency band.

Consequently, the signal dynamic range for a displacement measurement using a displacement sensor is S, whereas the signal dynamic range for a velocity sensor and integrator is S+R. The sensor dynamic range is defined as the maximum signal to the rms noise summed over the frequency band.

If the noise in the detector is white and the spectral density is N, then the rms noise $N_b$ in the band is given by $$(N_b)^2 = \int_{f_{min}}^{f_{max}} N^2 df$$

$$N_b = N(f_{max} - f_{min})^{\frac{1}{2}}$$

The threshold signal to noise ratios are given by $x_{min}/N_b$ and $v_{min}/N_b$ for the displacement and velocity sensors respectively. In order that the two types of sensor have the same detection threshold, the signal of the displacement sensor must be amplified by a factor given by $\beta$ where $$\beta = \frac{v_{min}}{x_{min}} = \omega_{min}$$

The threshold SNR for the displacement sensor is then $$\sigma_x = \frac{\omega_{min} x_{min}}{N_b}$$

The threshold SNR of the velocity sensor, after integration, is given by integrating $v_{min}$ to give $x_{min}$ and integrating the white noise to give $N_1$.

$$\sigma_1 = \frac{x_{min}}{N_1}$$

where $$(N_1)^2 = \int_{f_{min}}^{f_{max}} \left(\frac{N}{\omega}\right)^2 df = \frac{N^2}{4\pi^2}\left[\frac{1}{f_{min}} - \frac{1}{f_{max}}\right]$$

$$N_1 = \frac{N(f_{max} - f_{min})^{\frac{1}{2}}}{2\pi(f_{max}f_{min})^{\frac{1}{2}}} = \frac{N_b}{2\pi(f_{max}f_{min})^{\frac{1}{2}}}$$

The improvement in the SNR that results from measuring displacement by using a velocity sensor and integrator is given by $$\sigma = \frac{\sigma_1}{\sigma_x} = \left(\frac{f_{max}}{f_{min}}\right)^{\frac{1}{2}}$$

Expressing in dB gives $$20 \log(\sigma) = \frac{R}{2}$$

This improvement in SNR, due to integration of the velocity sensor output implies that the threshold SNR for the velocity measurement can be reduced by a factor of R/2 dB, that is to say the minimum signal can be lowered, relative to the noise floor. This also reduces dynamic range requirement of the system.

If the threshold SNR is required to be unity, then the sensor dynamic range for the displacement sensor is S dB. The required sensor dynamic range for the velocity sensor, in order to have the same dynamic range as the displacement sensor after integration is S+R/2 dB.

Therefore, a displacement measurement using a displacement sensor needs R/2 dB less dynamic range than a measurement using a velocity sensor, provided the noise is white and the extra amplification required for the displacement signal can be achieved and does not introduce significant extra noise.

For a bandwidth of 5–500 Hz, this represents an improvement of 20 dB.

Structure of a Preferred Embodiment

FIGS. 2 and 2a show a displacement hydrophone that uses a pressure signal on an optical fiber for detection. Referring to FIGS. 2 and 2a, the fiber 22 is housed in a pressure tubing 24, forming part of the geophone pressure chamber. If the tube length, L, is 1 m and has a diameter of 2 mm, the volume is $3.1 \times 10^{-6}$ m$^3$.

In the embodiment depicted in FIG. 2, a fluid pressure chamber 26 forms the liquid spring 12 which houses the pressure sensitive optical fiber 22. The optical fiber 22 is coated such that a time varying pressure signal alters the optical path length of the fiber.

Attached to or integral with the tube 24 is a signal receiving chamber 28. Within the chamber 28 is housed the proof mass 14, supported in its idle or Q state by a flexible set of spiders 30. The proof mass 14 is connected to the shaft 16 which penetrates the opening 18 into the fluid pressure chamber 26. Above the proof mass 14 is a fluid reservoir chamber 32 which is sealed off with a diaphragm 34. The chamber 32 is maintained pressurized by a spring 36. An opening 38 into the chamber 28 prevents hydraulic or pneumatic lock of the geophone.

Tables 1 and 2 illustrate exemplary values for the various parameters for the following discussion of a preferred embodiment.

TABLE 1

| Fiber parameters | | |
|---|---|---|
| Fiber length | 1 m | L |
| Coating gain | 100 | gain |
| Fiber sensitivity | 24.5 µR/Pa/m | $F_S$ |
| Detector noise | 10 µR/√Hz | N |
| Bandwidth | 500 Hz | B |

TABLE 2

| Derived quantities | | |
|---|---|---|
| Noise within band | 224 µR rms | $N_b = N\sqrt{B}$ |
| Detector sensitivity | 2450 µR/Pa | $D_S = F_S \cdot \text{gain} \cdot L$ |
| Pressure threshold | 0.091 Pa (≅1 µb) | $P_{min} = N_b/D_S$ |

FIG. 2a provides additional details of the shaft 16 as it penetrates the opening 18 into the chamber 26. The shaft has a diameter of 2r, which determines displacement into the chamber 26 for a given movement in the x direction (FIG. 1). The shaft 16 and the opening 18 are separated by a gap g which acts as a damping agent against shaft movement.

In operation, the geophone 10 is subjected to a seismic signal in the form of vibrations. As derived above, the resonant frequency of the assembly may be in the order of 10 Hz, for example 5.98 Hz. At frequencies above the resonant frequency, the mass 14 remains relatively stationary as the chamber 28 moves. This causes the shaft to move in and out of the chamber 26, creating a time varying pressure signal on the pressure sensitive fiber 22. The entire assembly is sensitive to this signal over a frequency band, and the sensor noise within the band is equivalent to a pressure signal of 1 µb rms in the preferred embodiment.

For the derived parameters provided in Tables 1 and 2 above, the maximum velocity of the geophone is 25 mm/s. The maximum displacement occurs when the frequency is 10 Hz.

$$|x| = \frac{|v|}{\omega} = 4.04 \times 10^{-4} m$$

Equating |x| with the movement Δx of the shaft 16 in the fluid chamber 26 (the condition above resonance) gives a change in volume Δv where $$\Delta v = A \Delta x = 7.93 \times 10^{-11} m^3$$

The maximum pressure is given by $$p = \frac{\Delta V}{V} K = 2.91 \times 10^4 \text{Pa}$$

Since the minimum signal level is 0.1 Pa, the dynamic range of the sensor is 109 dB.

If the mass of the piston is supported by the pressure in the liquid, then the distance moved by the piston and the pressure in the chamber can be calculated.

The spring constant of the fluid in the reservoir 26 is given by $$k = \frac{A^2 K}{V} = 14 \frac{N}{m}$$

The gravitational force exerted by a mass of $10^{-2}$ kg, by way of example, is given by $$F = mg = 9.81 \times 10^{-2} \text{ N}$$

Consequently the spring 36 is extended by a distance is $7 \times 10^{-3}$ m.

The static pressure in the chamber necessary to support the mass of the piston is $$p = \frac{mg}{A} = 5 \times 10^5 \text{Pa} \quad (5 \text{ bar})$$

In addition to the structure illustrated in FIG. 2, there are several ways to provide a seal for the mass and shaft combination within the scope of this invention. This is necessary to prevent the liquid leaving the chamber 26. One method is to use a leaky seal with a second filled chamber containing the upper part of the piston. FIG. 1 illustrates the use of an elastomer membrane 34 to act as a diaphragm.

If a leaky seal and second filled chamber are used, it is not possible to support the mass using the pressure in the chamber, since this will not allow a static pressure difference. Instead, a soft spring 36 is needed to support the mass. The spring 36 must therefore have a spring constant of less than the liquid spring (14 N/m). A higher spring constant for the spring 36 raises the resonant frequency of the geophone.

In the case of a diaphragm, it is possible to maintain a pressure difference, but 5 bars is probably impractical. It is possible to reduce the static pressure by decreasing the mass and volume, while increasing the area to keep the resonant frequency the same.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A geophone comprising:
   a. a pressure chamber filled with a fluid, the fluid exhibiting a resonant frequency;
   b. a pressure sensitive sensing clement in the pressure chamber; and
   c. a proof mass positioned to vary the pressure in the pressure chamber in response to a seismic signal, wherein the proof mass is adapted to remain stationary in response to a seismic signal at a frequency above the resonant frequency, and wherein the pressure chamber is adapted to move in response to the seismic signal.

2. The geophone of claim 1, wherein the pressure sensitive sensing element is an optical fiber.

3. The geophone of claim 1, wherein the pressure sensitive sensing element is a hydrophone.

4. The geophone of claim 1, wherein the pressure sensitive sensing element is a piezoelectric bender element.

5. The geophone of claim 1, further comprising:
   a. an opening on the top of the pressure chamber; and
   b. a shaft coupled to the mass, wherein the shaft movably penetrates the opening.

6. The geophone of claim 5, further comprising a mass pressure chamber enclosing the mass.

7. The geophone of claim 6, wherein the mass is flexibly held in the mass pressure chamber by supports.

8. The geophone of claim 7, further comprising a pressurizing diaphragm in contact with an upper surface of the mass, the pressurizing diaphragm defining a fluid reservoir.

9. The geophone of claim 8, further comprising a spring to retain pressure in the fluid reservoir.

10. A method of detecting a seismic signal comprising the steps of:
    a. enclosing a pressure sensitive optical fiber within a liquid filled pressure chamber, the liquid in the pressure chamber exhibiting a resonant frequency;
    b. positioning a mass so as to vary the pressure in the pressure chamber in response to a seismic signal, wherein the mass is adapted to remain stationary in response to a seismic signal above the resonant frequency, and wherein the chamber is adapted to move in response to the seismic signal;
    c. directing a light through the optical fiber;
    d. subjecting the chamber to a seismic signal, thereby varying the pressure in the chamber by moving the chamber while the mass remain stationary; and
    e. detecting variations in the light as the result of the variations in the pressure in the chamber.

* * * * *